US008881904B2

(12) United States Patent
Amy

(10) Patent No.: US 8,881,904 B2
(45) Date of Patent: Nov. 11, 2014

(54) CORROSION INHIBITING PACKAGING

(75) Inventor: Leslie John Amy, Lyndhurst (AU)

(73) Assignee: Australian Inhibitor Pty Ltd, Victoria (AU)

( * ) Notice: Subject to any disclaimer, the term of this patent is extended or adjusted under 35 U.S.C. 154(b) by 1683 days.

(21) Appl. No.: 13/380,496

(22) PCT Filed: May 11, 2007

(86) PCT No.: PCT/AU2007/000641
§ 371 (c)(1),
(2), (4) Date: May 1, 2012

(87) PCT Pub. No.: WO2007/131277
PCT Pub. Date: Nov. 22, 2007

(65) Prior Publication Data
US 2012/0205264 A1  Aug. 16, 2012

(30) Foreign Application Priority Data
May 11, 2006 (AU) .................. 2006902481

(51) Int. Cl.
| | | |
|---|---|---|
| B65D 85/84 | (2006.01) | |
| B65D 81/24 | (2006.01) | |
| B32B 25/08 | (2006.01) | |
| B32B 27/30 | (2006.01) | |
| B32B 27/08 | (2006.01) | |
| B32B 27/18 | (2006.01) | |
| B32B 25/14 | (2006.01) | |
| B32B 27/32 | (2006.01) | |
| B32B 25/04 | (2006.01) | |
| C23F 11/02 | (2006.01) | |

(52) U.S. Cl.
CPC ............... *C23F 11/02* (2013.01); *B65D 81/24* (2013.01); *B32B 25/08* (2013.01); *B32B 27/302* (2013.01); *B32B 2307/728* (2013.01); *B32B 27/08* (2013.01); *B32B 2307/306* (2013.01); *B32B 27/18* (2013.01); *B32B 2307/54* (2013.01); *B32B 25/14* (2013.01); *B32B 2553/00* (2013.01); *B32B 27/32* (2013.01); *B32B 2307/554* (2013.01); *B32B 27/306* (2013.01); *B32B 25/042* (2013.01); *B32B 2307/752* (2013.01); *B32B 2307/21* (2013.01); *B32B 2439/00* (2013.01)
USPC ..................... 206/524.4; 206/213.1

(58) Field of Classification Search
USPC .............. 206/205–213.1, 524.1–524.5, 524.8
See application file for complete search history.

(56) References Cited

U.S. PATENT DOCUMENTS

| | | | | |
|---|---|---|---|---|
| 2,629,649 | A * | 2/1953 | Wachter et al. | ............ 206/524.3 |
| 3,108,016 | A * | 10/1963 | Longstreth et al. | ........... 428/323 |
| 3,356,280 | A * | 12/1967 | Dunholter | ..................... 206/205 |
| 3,410,392 | A * | 11/1968 | Hermanson | ................... 206/205 |
| 3,936,560 | A | 2/1976 | Santurri et al. | |
| 4,823,945 | A * | 4/1989 | Adelman | ...................... 206/205 |
| 5,715,945 | A | 2/1998 | Chandler | |
| 6,033,599 | A | 3/2000 | Lozano et al. | |
| 6,321,907 | B1 * | 11/2001 | Honstrater | .................... 206/213 |
| 6,591,980 | B2 * | 7/2003 | Honstrater | ................. 206/213.1 |
| 6,787,065 | B1 | 9/2004 | Schapira et al. | |
| 7,112,169 | B2 * | 9/2006 | Honstrater | ................. 206/213.1 |
| 7,763,213 | B2 * | 7/2010 | Miksic et al. | ................. 206/205 |
| 2002/0167217 | A1 | 11/2002 | Higgins | |
| 2004/0234790 | A1 | 11/2004 | Smith et al. | |
| 2005/0238532 | A1 | 10/2005 | Walker | |

FOREIGN PATENT DOCUMENTS

| | | |
|---|---|---|
| DE | 10255258 A1 | 7/2004 |
| GB | 1451031 A | 9/1976 |
| GB | 2374388 A | 10/2002 |

* cited by examiner

*Primary Examiner* — Bryon Gehman
(74) *Attorney, Agent, or Firm* — Pearne & Gordon LLP

(57) ABSTRACT

A substrate in the form of a film is described for producing a corrosion inhibiting atmosphere for the storage and transport of exposed bare metal parts to inhibit rust or corrosion of the metal parts. In one form, the substrate is a co-extruded film having one layer for providing shape and form to the film when molded into a specific shape and the other layer containing a vapor corrosion inhibitor (VCI) for being admitted from the surface of the layer to form the corrosion inhibiting atmosphere. Other structures of the film are possible including triple layers and the like. The co-extruded film is formed by vacuum molding optionally with pressure forming assist to form the film into a semi-rigid or rigid shape for fitting over or enveloping the metal part to be protected. The advantage of the invention is to be able to provide a controlled corrosion inhibiting atmosphere for the normal duration that a metal part is being stored thereby reducing the chance that the metal part will develop rust or corrosion during storage.

39 Claims, No Drawings

CORROSION INHIBITING PACKAGING

FIELD OF THE INVENTION

The present invention relates to the manufacture and use of corrosion inhibiting packaging incorporating vapour corrosion inhibitors (VCIs) for inhibiting rust and corrosion occurring in metal surfaces, such as exposed metal surfaces when stored within the packaging.

One embodiment of the present invention relates to the manufacture and use of a co-extruded film containing VCI actives to form packaging from which film the VCI actives are released in a controlled manner to form a corrosion inhibiting atmosphere within the packaging to protect exposed metal surfaces located within the packaging, particularly against rust and/or corrosion for a lengthy period of time, particularly for at least as long a period of time as the metal surface is usually stored within the packaging.

Another embodiment of the present invention relates to the manufacture and use of packaging in the form of a protective cover made from a plastics film material containing active VCI compounds for use in inhibiting or preventing development of rust or corrosion in items located within the protective cover, such as for example, exposed metal parts, components, assemblies and the like during storage and transport of the parts or the like.

The present invention finds particular application in the manufacture and use of a semi-rigid protective cover, made from a co-extruded film, for use in storing and/or transporting an engine or engine component of a motor vehicle, particularly a semi-rigid protective cover for fitting over the flywheel/clutch assembly of the engine, to inhibit or prevent rust or corrosion of the engine or engine component, particularly the flywheel/clutch assembly when the engine is being stored and/or transported, or until the engine component is removed from the protective cover after the expected storage period.

Although the present invention will be described with particular reference to one embodiment of the packaging in the form of a protective cover for the clutch and flywheel assembly of an engine to protect the assembly from developing rust during storage and/or transport until the engine is assembled into a motor vehicle in which the protective cover is made from a film containing VCI compounds, it is to be noted that the scope of the present invention is not restricted to the described embodiment or described application but rather the scope of the present invention is more extensive so as to include other VCI compounds or compounds that behave like VCI compounds, the incorporation or impregnation of VCI or VCI-like compounds in a wide range of substrates, the use of the wide range of substrates containing the VCI compounds in other applications, different forms of the packaging other than the protective cover and the uses of the various forms of the packaging for a wide range of different items and end uses or the like.

BACKGROUND OF THE INVENTION

Although the present invention will be described with particular reference to packaging in the form of a cover for the flywheel/clutch assembly of an engine in storage or being transported, it is to be noted that this application is merely illustrative of the present invention and is provided for the purpose of ease of understanding the scope and application of the invention and to allow clarity of expression to describe and define the invention. Thus, the protective cover is one example only of the packaging of the present invention. Other examples include covers for disc brake assemblies, brake discs, and other exposed bare metal components.

Additionally, it is to be noted that the term VCI includes within its scope materials, compounds, compositions, formulations and the like which are vapour corrosion inhibitors, which are classified as or are described as vapour corrosion inhibitors, which function like vapour corrosion inhibitors or are the same as vapour corrosion inhibitors and similar materials including precursors for and derivatives of vapour corrosion inhibitors.

Metal components or assemblies have a tendency to rust or otherwise corrode soon after manufacture or assembly such as for example during storage, transportation or the like or when in transit, particularly if the metal is not treated against rusting before it is shipped, and particularly, if the component includes one or more surfaces of bare exposed metal. One example of the metal components is the flywheel/clutch assembly of a motor vehicle or the rotor and disc brake assembly of a motor vehicle. With increasing globalisation of manufacturing in the automotive industries, it is common place for subassemblies of motor vehicles such as engines, gear boxes, back axles, and the like to be made in one location and shipped to a different location for assembly. Quite often, one component is made in one country and is shipped to other countries, sometimes on the other side of the world for assembly and manufacture into a vehicle. As an example, engines made in Australia are shipped to Europe for assembly into European cars during their manufacture. During the many months of storage and transport, the exposed metal engine components have a tendency to begin to rust or corrode, particularly when subjected to large variations in temperature, humidity and other atmospheric conditions or the like, making it necessary to remediate the component before use, or in extreme cases when rust is too advanced, to discard the assembly altogether, both of which actions are undesirable as being costly, time consuming and/or detract from the appearance and/or performance of the component or finished product.

Although previously, there have been many attempts to prevent rust developing in engine assemblies, existing methods of rust proofing have not been entirely satisfactory for one reason or another. As an example, metal parts which have one or more exposed bare metal surfaces can be painted or provided with a protective or barrier coating physically applied directly to the bare metal part to prevent the development of rust during storage or transport of the component by covering the bare metal to present a barrier to moisture. However, such a coating would need to be removed entirely from the metal part or parts before use. Again, this is costly and time consuming as well as being potentially damaging to the part. Therefore, it is not possible to merely coat the exposed metal parts to protect them. Thus, there is a need for a system of rust prevention or inhibition which does not require the exposed metal parts to be physically directly coated with a coating that requires removing before the part can be used.

It has been surprisingly discovered that using vapour corrosion inhibitors can provide effective rust protection or corrosion inhibition without having to directly apply the coating to the parts since indirect application of the VCI actives is sufficient to produce a corrosion inhibiting coating provided by the VCI compounds. Additionally, it has been discovered that the VCI actives do not need to be removed from the metal components before use as is required when using previously available barrier coatings applied directly to bare metal surfaces.

However, in order for VCI to work effectively, it has been discovered that there needs to be controlled release of the VCI compounds or actives at or within a predetermined rate or range of rates to provide continuous protection for the metal parts during the entire period of storage and transit by providing and maintaining an effective corrosion inhibiting atmosphere for the storage life of the metal parts.

Accordingly, it is the aim of the present invention to provide packaging having controlled release of at least one VCI compound or active to maintain a corrosion inhibiting atmosphere or environment within which to store metal components having exposed bare metal surfaces in order to inhibit or prevent rust or corrosion of the metal component occurring during storage and/or transport.

Not only is it possible using the present invention to effectively control the release of VCI to form a corrosion inhibiting atmosphere by incorporating the VCI active into a film or substrate, particularly a substrate that promotes the controlled release of VCIs, which is one aspect of the present invention, but also embodiments of the invention can be improved by modifying the basic form of the invention by providing a modified substrate having improved controlled release of the VCIs which is another aspect of the present invention.

It has been discovered also that the performance of the invention could be improved if the high cost of the packaging made by the present invention could be reduced by lessening the amount of VCI incorporated into the film whilst still having release of the active material to produce an effective corrosion inhibiting atmosphere since VCI actives are expensive thereby resulting in the film into which they are incorporated being expensive to make and use, particularly as the packaging made from the film is discarded after use, usually after a single use only. Surprisingly, it has now been discovered also that the present invention can be improved by using a reduced amount of VCI active if a modified form of the carrier material in which the VCI active is incorporated is used to form the packaging.

Accordingly, it is another aim of the present invention to provide packaging and a method of forming packaging that involves the use of a reduced amount of VCI to provide an effective corrosion inhibiting atmosphere for protecting bare metal objects located within the packaging against corrosion by using modified forms of the film.

Previous attempts at rust protection of packaged metal parts have relied upon the use of flexible packaging for wrapping around the metal part to be protected, such as for example, wrapping the metal part in brown paper or Kraft paper optionally containing a rust preventative to completely envelope or surround the part. The use of flexible materials such as paper sheets to wrap separate items cannot be used for all occasions or in all circumstances for a variety of reasons, such as for example, in attempting to protect built assemblies of components where wrapping is not possible because of the size, configuration or location of the assembly. One example of an assembly that it is not possible to wrap completely to exclude corrosive contaminants, moisture or the like is the clutch/flywheel assembly of a motor vehicle engine. Another example is the disc brake assembly and disc rotor of a motor vehicle. In both of these circumstances it is not possible to wrap the rear of the assembly because of the other componentry and subassemblies of the motor vehicle being located in close proximity so that there is little or no clearance between the assembly to be protected and the other assemblies which prevents the flexible material from going around and covering the rear surface of the assembly that is to be protected. Merely placing a flexible sheet over the exposed side of the metal part does not provide the required protection. Thus there is a need for an alternative way of protecting assemblies of a complex or convoluted shape attached to or located near to other subassemblies from corrosion other than wrapping in a flexible paper sheet. It has now been discovered surprisingly that instead of using flexible sheets of paper to wrap the assemblies, a rigid or semi-rigid protective cover or similar that retains its shape during use can be used to provide the corrosion protection when the rigid or semi-rigid shaped protective cover is attached to the assembly. Until the discovery of the present invention it was thought that making a shaped or semi-shaped article containing a VCI to provide protection was not possible because the VCI compound may migrate or vaporise during manufacture of the shaped article, particularly if heat and/or pressure was used to form the shaped article, so that the VCI would be prematurely exhausted from the shaped article leaving insufficient VCI to provide a Vapour Inhibiting Atmosphere for sufficient duration to provide protection for the length of time the part was to be stored. Contrary to this expectation it has now been discovered that the VCI can be retained in the article during shaping by making the article from a substrate that has a layered structure or arrangement including more than a single layer in which the VCI is incorporated primarily into one of the layers and another of the layers primarily provides the ability to form the shaped article and for it to retain its shape, preferably by moulding the shaped article to conform very closely to the exact shape of the metal part which is to be protected. Accordingly, it is one aim of the present invention to provide a rigid or semi-rigid shaped article from a substrate having two or more layers in which one layer has a VCI active so that when the article is connected or attached to the metal part a corrosion inhibiting atmosphere is formed to provide protection for the metal part.

SUMMARY OF THE INVENTION

According to one aspect of the present invention, there is provided packaging made from a corrosion inhibiting substrate containing a carrier material and a corrosion inhibiting compound in which the substrate allows for the controlled release of the corrosion inhibiting compound from the substrate to form a corrosion inhibiting atmosphere or environment within the packaging by allowing controlled release of the corrosion inhibiting compound from the substrate.

According to another aspect of the present invention, there is provided a method of forming packaging for providing protection for a metallic object by preventing or inhibiting corrosion developing in the object, comprising the steps of forming the packaging from a plastics material in which a corrosion inhibiting material or compound is incorporated into the plastics material in such a manner to allow controlled release of the corrosion inhibiting material or compound from the plastics material to form a corrosion inhibiting atmosphere or environment in close proximity to the object, said corrosion inhibiting atmosphere being sufficient to protect the object against corrosion when the object is located within the atmosphere or environment.

According to another aspect of the present invention there is provided a protective cover for a metal component, part or assembly, said protective cover being formed from a plastics material having a first layer being a base layer at least assisting in providing rigidity to the protective cover and a second layer being a capping layer or active layer or layer containing an active material or compound wherein a corrosion inhibiting material is incorporated into the second layer in an amount sufficient to provide controlled release of the corrosion inhibiting material from the protective cover to form a corrosion inhibiting atmosphere or environment within the protective cover sufficient to effectively protect the part against corrosion when the part is located within the protective cover.

According to another aspect of the present invention, there is provided a corrosion inhibiting substrate comprising a carrier material and at least one corrosion inhibiting material wherein the corrosion inhibiting material is mixed with the carrier material such as to be incorporated in the carrier material to form the corrosion inhibiting substrate, said substrate allowing for the controlled release of the corrosion inhibiting material from the substrate to provide a corrosion inhibiting atmosphere or environment in close proximity to the substrate.

According to another aspect of the present invention, there is provided a method of forming a corrosion inhibiting substrate including the steps of forming a substrate having a backbone of carrier material in the form of a film or sheet, impregnating the film or sheet with a corrosion inhibiting compound wherein the substrate provides controlled release of the corrosion inhibiting compound to produce a corrosion inhibiting atmosphere or environment close to the surface of the film or sheet.

According to another aspect of the present invention there is provided a corrosion inhibiting film comprising a carrier material for forming the backbone or base layer of the film and a second layer in which a corrosion inhibiting material is incorporated into the carrier layer or the second layer in such a manner to allow a controlled release of the corrosion inhibiting compound from the film to provide a corrosion inhibiting atmosphere or environment for protecting an object located in the atmosphere or environment associated with the film.

According to another aspect of the present invention, there is provided a method of preventing corrosion or inhibiting corrosion developing in a metal part, particularly a metal part having an exposed bare metal surface, comprising the steps of providing packaging containing at least one corrosion inhibiting compound, locating the metal part within the packaging so as to be located in a corrosion inhibiting atmosphere or environment formed from controlled release of the inhibiting compound thereby preserving the metal part against corrosion or at least inhibiting the development of corrosion in or on the metal part.

BRIEF DESCRIPTION OF THE INVENTION (a) The Packaging

Typically, the packaging is a protective item or device. More typically, the protective item is a cover, cap, bag, shroud, housing, enclosure, box, carton, insert, container, or the like in which the metal object to be protected is stored. Even more typically, the protective item is a cap, cover, housing, shroud, enclosure, for the clutch/flywheel assembly of a motor vehicle or for the disc brake assembly or rotor of a motor vehicle.

Typically, the protective item is rigid, semi rigid or flexible. Preferably, the packaging and/or protective item is semi-rigid, more preferably a semi-rigid cap or cover for enclosing or enveloping the entire surface of an area of the bare metal component or part.

Typically, the protective item is formed with a cavity, chamber, hollow, well, insert, aperture, bore or similar for either partially or fully receiving the object to be protected therein including receiving part of the metal object. More typically, the corrosion inhibiting atmosphere or environment is formed within the cavity of the protective cover, cap or similar. Even more typically, the part to be protected is received either partially or fully within the cavity, etc. Even more typically, the protective part is fitted over or to the part to be protected with the part received in the cavity. Even more typically, the protective cover is fitted to the part. In some embodiments the part is air tightly fitted to the part whereas in other embodiments the fit is a "snug" fit but is not air tight. Typically, the protective item is a purpose designed container having a well or cavity designed to snugly receive the part to be protected from both physical damage as well as more or less temporary rust and corrosion protection. In one embodiment the cap or cover is moulded to a shape corresponding to the shape of the part being protected and is provided with lugs, tags or similar for clipping onto the metal part, preferably snap lock fittingly connected to the part. More preferably, the connecting lug or tab is moulded into the cap or cover to allow the cap or cover to be frictionally fitted to the part by engaging the part.

Typically, the package is made from a suitable substrate. More typically, the substrate is a sheet or film. More typically, the method of forming the protective item is moulding, vacuum forming, pressure forming, including high pressure forming or combinations of two or more such processes or the like. The cap or cover may have only suitable shape, form or configuration.

Typically, the package is formed at a temperature of up to about 200° to 220° C., preferably, up to about 180° to 200°, particularly when the package includes polypropylene, and/or polystyrene. Typically, the package is formed at a pressure of up to about 1.5 to 8.0 bar, preferably from about 1.5 to 6.0 bar depending upon the specific equipment being used to form the package.

As an example, if vacuum forming alone is used, the pressure is between about 1.5 to 2.0 bar, or if a combination of vacuum and pressure assist is used, the pressure is up to about 2.5 bar, whereas if high pressure forming is used, the pressure is up to about 8.0 bar or more.

Typically, when using vacuum forming to form the protective cover the process pre-heats the rigid substrate in the form of a sheet or film to a temperature of about 160° for a period of about 40 seconds prior to vacuum forming the protective cover.

When pressure forming is used to form the protective item, the die faces of the mould used in the mould for moulding the protective item are pre-heated only and the moulding operation under pressure is a single shot of about five seconds duration.

Typically, temperatures used in forming the packaging are up to about 160°, preferably combined with vacuum forming and/or pressure forming, including high pressure forming of up to about 8.0 bar.

Preferably, the cap or cover is semi-rigid and the semi-rigid protective cover formed using vacuum forming techniques.

(b) Substrate

Typically, the substrate can take any suitable form. A preferred form of the substrate is in the form of a film, sheet, roll, panel, strip, blank or the like. More typically, the substrate is a monolayer substrate having a single layer only, is a dual layer substrate having two layers, or a multi-layer substrate having three or more layers. If the substrate has more than one layer, the two or more layers can be the same or can be different depending upon the end use requirements of the packaging made from the substrate. If the layers are essentially the same, the different layers can have different additives and/or properties or characteristics as the different layers have different uses. More typically, the layers, if present, are chemically bonded to one other, such as to the adjacent layers.

If the substrate has a single layer only this layer is the carrier layer into which the VCI active or actives are incorporated. If the substrate has two layers, one of the layers is the base layer, backing layer or carrier layer, typically for providing integrity or form to the packaging, such as strength, rigidity, shape or the like, and the other layer is the capping or active layer having the VCI incorporated therein. Preferably, in the two layer embodiment the VCI is incorporated into the capping or active layer only. If the substrate has three or more layers, preferably one or both of the outer layers is the capping layer containing the VCI. In embodiments having a capping layer the VCI is not usually incorporated into the non-capping layers but is usually incorporated into the capping layer only in order to reduce the amount of VCI required, and hence the cost of the packaging made from the substrate.

Preferably, the substrate is a co-extruded substrate having two, three, four, five or more separately identifiable layers forming a layered or laminate structure. More preferably, there are two layers being a base layer, backing layer or carrier layer and a capping or active layer. However, other embodiments can have more layers such as three layers. One form of the embodiment having three layers is provided with a filler layer located between the capping layer and carrier layer. Preferably, the filler layer is the central or intermediate layer. The filler layer is incorporated to further reduce the cost of the substrate and hence the packaging.

In other forms of the three layer embodiment there maybe an adhesive layer or tie layer located between the base layer and active layer. In some embodiments there are two or three adhesive layers or tie layers arranged alternatively between the base layer and the active layer. Preferably the capping layer having the VCI is the outside layer of the substrate so that the VCI active can migrate through the layer for emission from the layer to form the corrosion inhibition atmosphere. More preferably, the capping layer is the inside layer of the packaging facing the bare metal part or component. It is to be noted that in some embodiments the VCI can be incorporated into one of the other co-extruded layers either in addition to being incorporated into the capping layer or in some instances if required in place of being incorporated into the capping layer.

Typically, the co-extruded structure includes a barrier layer, impervious layer or impenetrable layer or similar. Typically, the barrier layer is impervious or impenetrable to moisture, water, vapour, gases, contaminants, corrosive materials or the like. Typically, the barrier layer can be the carrier layer or is located adjacent to the carrier layer or is located between the carrier layer and the capping layer, or is adjacent to the capping or active layer.

Typically, one or more of the layers of the substrate, or the carrier layer or the capping layer is a hydrophilic layer for wicking moisture away from the surface of the metal component or film to further reduce corrosion of the bare metal surface. Typically, one of the layers is a cushioning layer to provide cushioning and abrasion resistance to prevent or reduce damage to the metal component. The cushioning layer may be a non woven layer, a soft layer, a resilient layer, an elastomeric layer, a layer provided with air bubbles, cells, or the like providing enhanced protection against damage to the metal component. Alternatively, the layer is a static-shielding layer, a foil layer, a heat-shielding layer or any other form of layer.

Typically, the capping layer is made either partially or entirely from styrene, styrene butadiene rubber (SBR), ethylene vinyl acetate (EVA), polypropylene, or combinations of two or more polymeric materials, and the like.

More typically, the capping layer is a SBR layer or an SBR containing layer having from about 0.1% to about 10% rubber content, preferably from about 0.5% to about 5% rubber content, most preferably about 2% rubber content. More typically, the capping layer has a melt flow index of about 12. One example of the material of the capping layer is STYRON 450. Whilst not wishing to be bound by theory it is believed that the rubber content facilitates migration of the VCI through the layer for release from the surface of the film in a controlled manner and assists in the controlled release of the VCI from the substrate so as to form and maintain the corrosion inhibiting atmosphere.

Preferably, one or more layers of the substrate, typically the backbone or carrier layer, is polyethylene, polypropylene, polystyrene, a styrene butadiene rubber, EVA or the like or is a polymeric material containing polypropylene, polystyrene, EVA, or the like optionally containing other monomeric or polymeric materials. More typically, the styrene is STYRON 484, STYRON 486, STYRON 450, high impact styrene, or the like. More typically, the styrene is supplied by Polystyrene Australia Pty Ltd. More typically, the carrier layer is in the form of a rigid or semi-rigid film so that the packaging can be formed as a rigid or semi-rigid product, such as the cap or cover.

A typical example of the capping layer containing the active VCI is STYRON 450 which is a very high flow, high impact polystyrene primarily designed for injection moulding applications typically requiring excellent flow and uniform surface gloss. Characteristics of STYRON 450 include the following:

| Physical Properties | | | |
|---|---|---|---|
| | Value | Unit | Standard ASTM |
| Mechanical Properties | | | |
| Tensile Strength: | 20(14) | MPa | D638 |
| Tensile Modulus: | n/a | MPa | D638 |
| Ultimate Elongation: | 55(45) | % | D638 |
| Flexural Strength*** | 36(31) | MPa | D790 |
| Flexural Modulus | 1.6(1.4) | GPa | D790 |
| Notched Izod Impact* | 71(68) | J/m | D256 |
| Thermal Properties | | | |
| Vicat Softening Temp | 94 | °C. | D1525-B |
| Heat Deflection Temperature | | °C. | D648 |
| Melt Flow Index (200/5) | 12 g/10 | min | D1238 |
| Glow Wire - Pass Temp** | 550 | °C. | AS2420 |
| Other | | | |
| Water Absorption | 0.03-0.05 | % | D570 |
| Mould Shrinkage | 0.4-0.6 | % | D955 |
| Linear Expansion (*$10^{-5}$) | 5-8 | Mm/mm/°C. | D696 |
| Specific Gravity | 1.05 | | D792 |
| Hardness | R | | D785 |

Specimen Thickness:
*12.7 mm,
**3.2 mm,
***6.4 mm
Note:
Values in ( ) are compression moulded data

| Processing Conditions | | |
|---|---|---|
| | Value | Unit |
| Material Preparation | | |
| Drying Temperature | 60-80* | °C. |
| Drying Time: | 2* | h |

-continued

| Injection Moulding | | |
|---|---|---|
| Melt Temperature | 200-220 | °C. |
| Mould Temperature | 5-60 | °C. |
| Barrel Temperature | 170/190/220 | °C. |
| Injection Speed | Medium | |
| Screw Speed: | 40-60 | RPM |
| Back Pressure | 0.5-1.0 | MPa |
| Clamp Pressure | 2.5-3.0 | Kn/cm$^2$ |
| Extrusion | | |
| Barrel Temperature | n/a | °C. |
| Melt Temperature | n/a | °C. |
| Chill-Roll Temperature | n/a | °C. |
| Die Temperature | n/a | °C. |

Comment
*Predrying is not necessary except in cases where a good surface finish is required using a highly pigmented grade.

A typical example of the carrier layer is STYRON 486B which is a high impact polystyrene with good heat resistance and excellent tensile properties. It is suitable for injection moulding applications requiring high impact strength and rigidity.

STYRON 486B has the following characteristics:

| Physical Properties | | | |
|---|---|---|---|
| | Value | Unit | Standard ASTM |
| Mechanical Properties | | | |
| Tensile Strength: | 26(19)) | MPa | D638 |
| Tensile Modulus: | n/a | MPa | D638 |
| Ultimate Elongation: | 62(5) | % | D638 |
| Flexural Strength*** | 46(37) | MPa | D790 |
| Flexural Modulus | 2.0(1.6) | GPa | D790 |
| Notched Izod Impact* | 105(85) | J/m | D256 |
| Thermal Properties | | | |
| Vicat Softening Temperature | 102 | °C. | D1525-B |
| Heat Deflection Temperature | | °C. | D648 |
| Melt Flow Index (200/5) | 2.5 g/10 | min | D1238 |
| Glow Wire - Pass Temp** | 550 | °C. | AS2420 |
| Other | | | |
| Water Absorption | 0.03-0.05 | % | D570 |
| Mould Shrinkage | 0.4-0.6 | % | D955 |
| Linear Expansion (*10$^{-5}$) | 5-8 | Mm/mm/° C. | D696 |
| Specific Gravity | 1.05 | | D792 |
| Hardness | | R | D785 |

Specimen Thickness:
*12.7 mm,
**3.2 mm,
***6.4 mm
Note:
Values in ( ) are compression moulded data

| Processing Conditions | | |
|---|---|---|
| | Value | Unit |
| Material Preparation | | |
| Drying Temperature | 60-80* | °C. |
| Drying Time: | 2* | h |
| Injection Moulding | | |
| Melt Temperature | 200-220 | °C. |
| Mould Temperature | 5-60 | °C. |
| Barrel Temperature | 170/190/220 | °C. |
| Injection Speed | Medium | |
| Screw Speed: | 40-60 | RPM |
| Back Pressure | 0.5-1.0 | MPa |
| Clamp Pressure | 2.5-3.0 | Kn/cm$^2$ |
| Extrusion | | |
| Barrel Temperature | 170/190/220 | °C. |
| Melt Temperature | 200-220 | °C. |
| Chill-Roll Temperature | 50-80 | °C. |
| Die Temperature | 200-220 | °C. |

Comment
*Predrying is not necessary except in cases where a good surface finish is required using a highly pigmented grade.

Typically, the backing layer or carrier layer or backbone layer is made from one material and the capping or active layer containing the VCI active is made from the same or a different material. The capping layer includes AUSTREX 5555 without polybutadine rubber. Typically, the backing layer or main body is STYRON 4868.

More typically, the polypropylene is MOPLENE 301h, or is a linear low density polypropylene, high density polypropylene, or the like.

Other materials from which the film could be made include polyurethane, polyester, polyether, polypropylene or any other suitable material or the like. It is to be noted that it is preferable that the material from which the layer or layers are made have release characteristics.

In embodiments having a single layer, typically the thickness of the carrier or backing layer, particularly the polystyrene film forming the backing layer is from about 25 micron to about 1000 micron, preferably from about 400 to 900 micron, more preferably from about 500 to 900 micron, or most preferably from about 600 to 900 micron, or the like. However, it is to be noted that the film can be of any suitable thickness ranging from about 25 to about 1000 micron. Typically, there is about 3% of VCI in the capping layer or polystyrene. However, other amounts of VCI can be included depending upon requirements.

Typically, the polypropylene is MOPLENE 301h polypropylene. Typically, the thickness of the polypropylene film is 600 micron. However, the thickness can vary from about 25 to about 1000 micron and the amount of VCI added to the layer or to the film is about 3%.

Typically, the sheet or film of polystyrene or polypropylene impregnated with the VCI is formed into the protective item. Typically, the method of forming the protective item is moulding, vacuum forming, pressure forming, high pressure forming or combinations of two or more such processes, preferably a combination of vacuum forming and pressure assist.

Typically, the substrate is formed by co-extrusion. More typically, the substrate is formed by extruding or co-extruding a base layer or carrier layer containing the carrier material and an active layer containing the corrosion inhibiting compound. Even more typically, the layers are co-extruded substantially simultaneously to form a dual extrusion, triple layer extrusion or multi-extrusion layers of film, sheet, roll, or other form of substrate.

Typically, the carrier layer or capping layer or both can be of a material that is used, recycled, new, virgin, reworked, milled, scrap material or the like. Typically, the used etc material is mixed with new material. Typically, up to about 20%, preferably up to about 10% of used or recycled material is included in the new material. It is to be noted that reused material or the like are incorporated into the backbone or main body layer only.

In embodiments having an active capping layer, typically the capping layer will be between about 20 to 90 micron, preferably about 40 to 80 micron, more preferably from about 50 to 70 micron in thickness and will have about a 3% add rate for the VCI active.

Typically, the main body layer will be about 100 micron to about 1000 micron, preferably from about 600 to 700 micron.

Typically, the films containing the VCI active range from general use films of polyethylene film to shrink wrap film, stretchable film, or reinforced film. Typically, the films can be clear, transparent, translucent, or opaque or have any amount of light transmission. Typically, the films can be coloured, dyed, tinted, or be of any colour, tone, hue or the like.

Typically, the film or substrate can include additives. Typical examples of additives include pigments, antistatic agents, viscosity modifiers, processing aids, whitening agents, calcium carbonate, silica, anti-slip agents, UV inhibitors, flame retardant inhibitors, and the like.

One preferred co-extruded film for making the packaging includes the following construction. The inside layer of the film forming the capping layer is a linear low density polypropylene layer of about 25 micron thickness having 5% by weight Ferro Master Batch VCI incorporated therein. The intermediate layer incorporated as a filler layer is a polypropylene layer of about 150 micron with a small amount of linear low density polypropylene included for providing flex to the co-extruded film. The outside layer forming the carrier layer or barrier layer is a 25 micron thickness linear low density layer having 1% by weight of blue saleeba 4070 colour pigment to impart colour or tint to the co-extruded film.

Thus, the backing or carrier layer can be a single layer, dual layer or have two or more layers depending upon the exact requirements of the co-extruded film.

(c) VCIs

The VCI used in the present invention can be any suitable material responsible for forming a corrosion resistant or inhibiting atmosphere particularly materials that are readily vaporised or the like. More typically, the VCIs are responsible for readily forming a vapour, particularly an increase in the vapour pressure of the VCI since it is advantageous to quickly saturate the air in the well or cavity of the package with VCI so that rust inhibition of the bare metal part can commence almost as soon as the cover is placed over the metal part. It is desirable that the VCI be readily able to form a corrosion inhibiting atmosphere since it is in the early stages of packaging that metal objects are the most vulnerable to corrosion. If necessary, the film or the package can be warmed or heated since increasing the temperature of the substrate containing the VCI results in the VCI molecules migrating faster through the substrate and being released from the substrate to provide a corrosion inhibiting atmosphere more quickly, thereby providing corrosion protection much sooner.

Typically, the VCIs include nitro inhibitors such as for example sodium nitrite, dicyclohexylamine nitrite, cyclohexylamine nitrite, diisopropylamine nitrite, or non nitrite containing materials, such as for example, tolyltriazole amine salts, carboxylates, benzoates, triazole sodium nitrate, cyclohexamine or the like.

Typically, the VCIs are provided by companies such as Cortec Corporation of the United States, Daubert Cromwell of the United States, Zerust Company of the United States and others.

The VCIs that can be used in the present invention can be used to inhibit or prevent corrosion caused by a variety of conditions since they are many contaminants that can cause and/or accelerate corrosion, such as for example, chlorides, sulphur dioxide, hydrogen sulphide, heavy condensation, oxygen, water, acidic or alkaline, conditions or the like which can lead to rapid corrosion.

Typically, the VCIs are multifunctional in that the VCI or VCIs added to the substrate contain inhibitors against corrosion of a variety of different metals, ie multiple metals, such as by providing protection for steel, copper, aluminium, alloys or the like. By using a multi-metal VCI the film provides corrosion protection to most metals used in engineering. Preferably, the VCI's provide protection for iron and steel and derivatives or alloys containing these materials and accordingly the preferred VCIs are ferrous VCIs.

Typically, the amount of VCI added to the substrate is from about 0.001% to about 20%, preferably from about 0.01% to 10%, more preferably from about 0.1% to about 8%, even more preferably from about 1% to 6%, and most preferably from about 1% to 5%, by weight based on the total weight of the substrate.

Typically, the amount of VCI active added to the film is from about 0.0001 gram per square meter to about 10 grams per square meter. Preferably, the amount of VCI active is from about 0.0002 to about 2.0 gram per square meter, more preferably from about 0.002 to about 1.0 gram per square meter.

Typically, the VCI active is dispersed throughout the carrier material, preferably substantially uniformly dispersed. However, it is to be noted that the VCI active may not necessarily be substantially universally dispersed but localisation of the VCI in the substrate can be tolerated since the VCI active can migrate in a greater or lesser amount through the substrate to the surface of the film for release from the surface of the film at the required rate of release.

Typically, the VCI actives can be in any suitable form or state, such as for example liquid, powder, granules, particles, impregnated foam, impregnated plastic, or the like.

Preferably, the VCI is Ferro Master Batch™ supplied by Daubert Cromwell of USA for use with all ferrous based metals, or Metalguard™ supplied by Daubert Cromwell of USA for use with non-ferrous metals.

Typically, the VCI active provides one or more monomolecular layers of protection over the surface of the exposed metal part. More typically, the protective layer is up to about 10 molecules thick, preferably from up to 3 to 5 molecular layers, more preferably is a monomolecular layer.

More typically, the VCI active forms a re-healing and self repairing layer through replenishing the protective layer by further condensation of the vapour of the VCI active.

Typically, a VCI emitter can be included within the packaging, such as for example, within the well or cavity of the protective cover to provide additional release of the VCI active to complement the active being released from the film surface or active layer, such as for example, to quickly establish the corrosion inhibiting atmosphere or to provide a boost to maintain the atmosphere.

Typically, the VCI or VCI emitter can hasten the initial establishment of the atmosphere or be used to maintain an established corrosion inhibiting environment. VCI emitter devices are used to increase the quality of VCI within a package and volatise and saturate an enclosed space at a faster rate than VCI film alone. The VCI emitter devices are separate to the VCI containing film and are replacable within the package.

Typically, the VCI emitter has controlled release of the VCI active therefrom. More typically, the VCI emitter can be designed to provide a different rate of release compared to the release rate of the film or packaging. Even more typically, the rate of release of the VCI emitter is greater than the release rate of the capping layer of the protective cover to quickly produce the corrosion inhibiting atmosphere.

In one form the VCI actives are generally organic compounds generally fused inside low density resin in the form of granules, that have sufficient vapour pressure under ambient atmospheric conditions to essentially travel from the surface of the granules to the surface of the metal by diffusion to be physically absorbed onto the surface of the metal in a very thin layer of a few molecules thick. In the presence of moisture the molecules of the VCI active become polarised to be attracted to the anode and the cathode of the metal respectively depending on the exact polarity of the molecules. Once the VCI protector is absorbed onto the surface, the electro chemical process of corrosion is interrupted as the ions create a protective barrier to contaminants such as oxygen, water, chlorides, other corrosive agents, accelerators or the like. With the protective mono layer of VCI molecules in place, the corrosion cell can not form and thus corrosion is halted.

One preferred embodiment of the present invention is a protective cover made by vacuum moulding with pressure assist a triple layer substrate which has been co-extruded with three layers in which one layer, being the outermost layer of the protective cover facing away from the metal part to be protected is essentially a 25 micron thick barrier layer made from linear low density polypropylene containing additives, such as for example, colorants and UV stabilising additives reducing degrading of the substrate on exposure to sunlight. Optionally, the barrier layer can also contain polyethylene. The second layer is a 150 micron thick central layer provided as a filler layer to lessen the cost of the substrate and to provide bulk for the packaging, by increasing the desirable properties of a semi-rigid or rigid protective cover. This central filler layer includes low density polyethylene. The third layer which is a boundary layer located as the innermost layer of the protective cover for being located in face to face relationship with the metal part to be protected contains 5% VCI actives. This layer which is 25 micron thick is predominantly linear low density polyethylene and is the layer through which the VCI actives migrate to be emitted from the inner surface of the protective cover.

Whilst not wishing to be bound by theory it is thought that the advantages of the present invention are derived from unique behaviour of the VCI actives. After migrating to the surface of the outer layer of the substrate forming the packaging, the VCI actives are volatile, and are released from the surface of the outer film to diffuse through the air to contact the metal surface that it is desired to protect. Accordingly, metal surfaces do not need to be in direct contact with the packaging material containing the VCI, but rather the metal components only need to be located in an atmosphere containing the VCI's formed by the release of the VCI's from the surface of the protective cover or other packaging material in which the part to be protected is located so that the molecular layer of protection can be deposited on the bare metal surface. The VCI's passivate the metal surface to which they adhere thereby eliminating the opportunity for corrosion to commence. Additionally, the VCIs are virtually undetectable on the surface of the metal and thus do not interfere with the properties of the metal or non-metallic portions of the part, component or assembly such as for example, parts made from glass, rubber or plastics. Further, the VCIs do not need to be removed from the various surfaces, most notably the metal surface prior to further processing of the metal or components before being put to use or the like including assembly of the components.

DETAILED DESCRIPTION OF EMBODIMENTS OF THE INVENTION

The present invention will now be described by way of non-limiting example with reference to the following examples:

Example 1

Manufacture of Co-Extruded Film Semi-Rigid Plastics

In one embodiment of the present invention, a co-extruded film having two layers is formed in a co-extruding machine. In this embodiment, granules of a polystyrene material, STYRON 486, are loaded into one hopper of a Welex co-extrusion machine whereas granules of another polystyrene, STYRON 450 together with granules of a VCI active, being Ferro Master Batch™ provided by Daubert Cromwell, in an amount of 3% by weight based on the weight of the STYRON 450, is loaded into a second hopper of the Welex co-extruder.

The operating parameters of the co-extruder are adjusted so that the co-extruder is able to co-extrude a film having two layers. The film being co-extruded comprises a first layer in the form of a carrier layer of STYRON 486 having a thickness of about 620 micron co-extruded substantially simultaneously with a second layer in the form of a capping layer having a thickness of about 60 micron and about 3% by weight VCI. Thus, a co-extruded film is formed with a carrier layer free of VCIs and a capping layer having the VCIs. The co-extruded film is wound onto a suitable roller to form a roll of co-extruded film in preparation for forming the protective cover therefrom.

The roll of co-extruded film is transported to a suitable vacuum forming machine such as a machine known as the Illig machine. The roll of co-extruded film is fed through the vacuum forming machine to form individual protective covers by a suitable vacuum forming technique. Alternatively, the protective covers are formed by a vacuum pressure assist technique involving use of vacuum forming in combination with pressure assist. The protective covers are formed over and around a mould having a die face. The die face is heated, typically to a temperature of from about 120° C. to about 180° C., preferably about 140° C. to about 160° C., more preferably less than about 160° C.

In one embodiment the protective caps are a form of temporary packaging for use to protect the flywheel/clutch assembly of a motor vehicle engine during storage and transportation in preparation for installation in a motor vehicle during assembly of the motor vehicle. In another form the protective cap is fitted over the disc brake assembly and rotor to protect the assembly against rust during storage and transportation. It is to be noted as the protective cap or cover is a disposable item, such as a one-time-use throw away item, it is desirable to produce the cap or cover at as low a cost as is possible, hence the need to use a minimum or optimum amount of VCI in the capping layer of the co-extruded film. Any waste material remaining from the formation of the protective cover is recycled by being granulated and re-introduced into one of the hoppers of the co-extruder.

It is to be noted that the capping layer containing STYRON 486 forms the outer layer of the protective cap facing outwards from the metal part whereas the STYRON 450 containing rubber and the VCI forms the inside layer forming the boundary of the wall or chamber of the cap facing the exposed bare metal surface of the part being protected so as to allow the VCI to migrate towards and onto the metal part.

Test Results

Tests conducted on protective covers made in accordance with the present invention as a comparison to covers not made in accordance with the present invention include the following:

The results of tests are shown in tables 1, 2, 3 and 4. Table 1 provides details of results of investigation into the use of substrates impregnated with VCI as compared to the use of the same substrates without VCI referred to as control samples.

In the results of Table 1, sample one of this test includes jar id no. 1 which corresponds to the use of a 600 micron thick monolayer of clear styrene to form the flywheel/clutch protective cover. The results obtained using this control shows that after just seven days rust was noted on the edge of the flywheel and rust continued to be noted as being present throughout the duration of the test period culminating in rust being present after 28 days at which time it was observed that there was rust on the edge of the ring gear and inner gear.

Sample two identified as jar id no. 2 shows the result obtained using a protective cover made in accordance with the present invention containing 3% by weight VCI impregnated styrene, formed by a combined vacuum and pressure assist method. It was observed that there was no sign of rust visible even after 28 days.

Samples three and four are duplicate samples of unprotected steel plates being encased by a styrene substrate not having VCI. Both duplicate samples showed 70% rust on the edge and 10% on the face of the steel plates appearing after seven days.

Samples five and six are duplicate samples of metal discs showing the use of styrene without VCI. The results indicate that rust was observable only after seven days viz, 20% face and 40% face (rust stains), respectively.

Samples seven and eight are duplicate samples of the present invention by providing a protective cover of a monolayer of styrene impregnated with 3% Ferro Master Batch™ VCI showing that even after 28 days there was only about 5% corrosion to both face and edge noted.

Samples nine and ten are duplicate samples of the present invention in respect of metal plates protected by a polystyrene film having 3% VCI. The duplicate samples showed minimal rust only after seven days (Edge 5%, Face nil) leading to increased amounts of rust after 28 days.

The present invention will now be described with reference to table 2 showing differences between vacuum forming and pressure forming a monolayer of styrene with and without VCI as compared to pressure forming and vacuum forming monolayers of polypropylene with and without VCI.

Sample one involves the use of a monolayer of STYRON 486 having a thickness of 600 micron with 3% VCI added in which the substrate was formed by a combination of vacuum forming and light pressure assist. Sample two was a duplicate of sample one and the results of both samples show that there was no corrosion even after 28 days on either the face or edge.

Samples three and four are duplicate samples of using a monolayer of STYRON 486 film formed using high pressure into the protective cover at 600 micron thickness with 3% VCI being incorporated into the film. Both duplicate samples three and four show only 2% rust or corrosion to the face and edge even after 28 days.

Duplicate samples five and six show the use of a protective cover comprising a monolayer of a polypropylene, MOPLENE 301h, at 600 micron thick with 3% VCI made by a combined vacuum forming and light pressure assist. The use of this substrate resulted in an initial 2% corrosion developing rising to 10% after 28 days.

Samples seven and eight are duplicate samples of a protective cover formed by high pressure forming a monolayer of MOPLENE 301h polypropylene at 600 micron thickness with 3% VCI. Both examples, exhibited 5% corrosion after only 5-7 days rising to 10 or 15% after 28 days.

Duplicate samples nine and ten relate to the use of a monolayer of styrene 486 without VCI added formed by vacuum forming with light pressure assistance showing an increase in corrosion of 10% after seven days to 40% after 28 days.

Duplicate samples 11 and 12 relate to the use of a monolayer of polypropylene having no VCI with a thickness of 600 micron showing that initially after seven days there was up to 10% corrosion rising to 20% after 28 days.

Table three illustrates the results obtained in example three showing the differences obtained when using protective covers that were formed by high pressure as compared to protective covers that were formed by vacuum forming with light pressure assistance.

Samples one and two are duplicate samples of using steel protected by substrates that were high pressure formed containing 1% Ferro Master Batch™ VCI. After 28 days there was 5% corrosion around the edge observed. Until this time there was no corrosion observed on the face or edge.

Duplicate samples three and four show the use of 1% Ferro Master Batch™ VCI added to the substrate vacuum formed with high pressure assist containing 1% Ferro Master Batch™ VCI resulting in no observable corrosion.

Duplicate samples five and six show the use of polystyrene without VCI added resulting in rust being observed on the edge of the sample tested after only 7 days with increasing corrosion over time.

Table 4 shows the results of accelerated testing of a monolayer film of styrene containing VCI as compared to a co-extruded film of styrene containing VCI both in the form of films and when formed into protective covers.

In samples 1 to 8 the table shows the results of tests conducted on the film only whereas samples 9 to 12 show the results when the film is formed into protective covers.

Samples 1 and 2 are duplicate samples of steel plates located in close proximity to STYRON 486 film containing 3% Ferro Master Batch™ VCI in accordance with the present invention. The samples show no sign of rust even after 28 days.

Samples 3 and 4 are duplicate samples of steel plates located near to a co-extruded film of STYRON 555 of 620 micron thickness and STYRON 486 having 3% Ferro Master Batch™ VCI of 80 micron thickness. These samples show no sign of rust even after 28 days.

Samples 5 and 6 are duplicate samples of steel plates located near to a co-extruded film of STYRON 450 of 620 micron thickness and STYRON 486 having 3% Ferro Master Batch™ of 80 micron thickness. These samples show no sign of rust even after 28 days.

Samples 7 and 8 are duplicate samples of steel plates located near to a monolayer of STYRON 486 of 700 micron thickness having no VCI incorporated into the single layer film. Rust was observable after only 7 days with increasing amounts of rust developing over time.

Sample 9 is a sample of steel plate located next to a protective cover made from vacuum forming with light pressure assist, a mono layer of STYRON 486 with 3% Ferro Master Batch™ laving a thickness of 700 micron. No signs of rust were observable even after 28 days.

Sample 10 is a sample of steel plate located next to a protective cover made from vacuum forming with light pressure assistance, a co-extruded film having a layer of 620 micron thickness STYRON 555 and a layer of 80 micron STYRON 486 with 3% Ferro Master Batch™. No signs of rust were visible even after 28 days.

Sample 11 is a sample of steel plate located next to a protective cover made from vacuum forming with light pressure assistance, a co-extruded film of a 620 micron layer of STYRON 450 and a 80 micron layer of STYRON 486 with 4% Ferro Master Batch™. No signs of rust were observable even after 28 days.

Advantages of the Invention

One advantage of the present invention is the use of a co-extruded film comprising at least a base layer of material and a capping layer forming a protective packaging for metal parts, components and assemblies in which the VCI is contained in the active layer only and is able to migrate to the surface of the capping layer for controlled release. This allows a significantly reduced amount of VCI to be incorporated into the protective packaging. The base layer provides the structural integrity of the packaging such as by providing the rigidity and the capping layer which is relatively thin as compared to the thickness of the base layer can contain a significantly reduced amount of VCI since all of the VCI in the capping layer can migrate to the surface for controlled release so that less VCI is required using the present invention than would be required under the previously available system where the VCI will be distributed substantially uniformly throughout the entire thickness of the single layer film forming the protective packaging.

Another advantage of the present invention is that the amount of VCI added to the packaging and/or film can be accurately controlled by incorporating it into the capping layer so that there is more regulated or controlled release of the VCI from the capping layer in accordance with the amount of protection required and the duration of protection required as the VCI does not have to migrate through the entire thickness of the cover, only through the capping layer.

Another advantage of the present invention is that VCI containing packaging has a built-in defence mechanism or self repairing mechanism, unlike barrier film products, which allow the packaging to re-establish the corrosion inhibiting environment. As an example, as temperature and humidity increase, generally relating in a more corrosive environment, the packaging having the VCI of the present invention can emit a greater amount of protective molecules since the molecules are released at a faster rate. This allows a greater concentration of VCI molecules to produce a more effective environment to combat the more increasing corrosive environment to which the parts would have been subjected if it was not for the corrosion inhibiting molecules in the atmosphere.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

TABLE 1

| MATERIAL TESTED | JAR ID NO | 7 DAYS | 14 DAYS | 21 DAYS | 28 DAYS |
|---|---|---|---|---|---|
| Flywheel/clutch Clear styrene .6 mm (control) | 1 | Rust on edge | Rust on edge no change | Rust on edge no change | Rust on edge on ring gear, and inner |
| Flywheel/clutch v.c.i impregnated styrene | 2 | No signs of spot rust | No signs of spot rust | No signs of spot rust | No signs of spot rust |
| Car body steel 50 mm × 50 mm natural styrene 150 mm × 60 mm (control) | 3 | Edge 70% Face 10% | Edge 70% Face 30% | Edge 80% Face 40% | Edge 90% Face 50% |
| Car body steel 50 mm × 50 mm natural styrene 150 mm × 60 mm (control) | 4 | Edge 70% Face 10% | Edge 70% Face 40% | Edge 80% Face 40% | Edge 90% Face 50% |
| Metal discs 15 mm dia. natural styrene 150 mm × 60 mm (control) | 5 | 20% face | Face 30% Edge 40% | Face 30% Edge 40% | Face 30% Edge 40% |
| Metal discs 15 mm dia. natural styrene 150 mm × 60 mm (control) | 6 | 40% face Rust stains? | Face 40% Edge 30% | Face 70% Edge 30% | Face 80% Edge 40% |
| Car body steel 50 mm × 50 mm v.c.i. impregnated styrene 150 mm × 60 mm | 7 | Edge 5% Face Nil | Edge 5% Face 5% | Edge 5% Face 5% | Edge 5% Face 5% |
| Car body steel 50 mm × 50 mm v.c.i. impregnated styrene 150 mm × 60 mm | 8 | Edge 5% Face Nil | Edge 5% Face 5% | Edge 5% Face 5% | Edge 5% Face 5% |
| Metal discs 15 mm dia. v.c.i. impregnated styrene 150 mm × 60 mm | 9 | Edge 5% Face Nil | Edge 10% Face 5% | Edge 10% Face 5% | Edge 5% Face 5% |
| Metal discs 15 mm dia. v.c.i. impregnated styrene 150 mm × 60 mm | 10 | Edge 5% Face Nil | Edge 10% Face 5% | Edge 20% Face 30% | Edge 20% Face 30% |

TESTING CONDITIONS: commence 6 hours ambient switching to 6 hours at +40° C. 6 hours to ambient then 6 hours to −5° C.
TESTING PANELS: 50 MM$^2$ CAR BODY STEEL
PREPARATION: (all samples handled with gloves only) Abrade with 240 Adalox paper Hexane wash. Samples placed on tables in separate jars with 50 ml demineralised water.

TABLE 2

"ACCELERATED CORROSION TESTING" Test no. 30
Comparative testing of high impact styrene and polypropylene both pressure and vacuum formed products employed (metalguard masterbatch)

| MATERIAL TESTED | JAR ID NO | 7 DAYS | 14 DAYS | 21 DAYS | 28 DAYS |
|---|---|---|---|---|---|
| Car body steel 50 mm × 50 mm Vacuum formed styrene 486 | 1 | 0% f 0% e | 0% f 0% e | 0% f 0% e | 0% f 0% e |
| Car body steel 50 mm × 50 mm Vacuum formed styrene 486 | 2 | 0% f 0% e | 0% f 0% e | 0% f 0% e | 0% f 0% e |
| Car body steel 50 mm × 50 mm Pressure formed styrene 486 | 3 | 2% f 2% e | 2% f 2% e | 2% f 2% e | 2% f 2% e |
| Car body steel 50 mm × 50 mm Pressure formed styrene 486 | 4 | 2% f 2% e | 2% f 2% e | 2% f 2% e | 2% f 2% e |
| Car body steel 50 mm × 50 mm Vacuum formed polyprop moplen | 5 | 2% f 2% e | 5% f 5% e | 5% f 5% e | 5% f 10% e |
| Car body steel 50 mm × 50 mm Vacuum formed polyprop moplen | 6 | 2% f 2% e | 5% f 10% e | 5% f 10% e | 5% f 10% e |
| Car body steel 50 mm × 50 mm Pressure formed polyprop moplen | 7 | 5% f 5% e | 10% f 15% e | 10% f 15% e | 10% f 15% e |
| Car body steel 50 mm × 50 mm Pressure formed polyprop moplen | 8 | 5% f 5% e | 10% f 15% e | 10% f 15% e | 10% f 15% e |
| Car body steel 50 mm × 50 mm Natural styrene (control) | 9 | 10% f 20% e | 20% f 30% e | 20% f 30% e | 40% f 40% e |
| Car body steel 50 mm × 50 mm Natural styrene (control) | 10 | 0% f 10% e | 20% f 30% e | 20% f 30% e | 40% f 40% e |
| Car body steel 50 mm × 50 mm Natural polypropylene (control) | 11 | 5% f 10% e | 5% f 10% e | 10% f 15% e | 20% f 20% e |
| Car body steel 50 mm × 50 mm Natural polypropylene (control) | 12 | 5% f 10% e | 10% f 10% e | 10% f 15% e | 20% f 20% e |

Edge test 0%-100% estimation of amount of corrosion occurring on the edge of car body steel.
Face test 0%-100% estimation of amount of corrosion occurring on the face of car body steel.
TESTING CONDITIONS: commence 6 hours ambient switching to 6 hours at 40-44° C. Back to 6 hours ambient, switching to 6 hours at −5° C.
TESTING PANELS: 50 MM$^2$ CAR BODY STEEL
PREPARATION: Abrade with 240 Adalox paper Hexane wash. Wrapped with rigid plastic 100 mm × 150 mm. Samples placed on tables in separate jars with 50 ml demineralised water.

TABLE 3

"ACCELERATED CORROSION TESTING" Test no. 31
Comparative tests of high impact styrene
Both high pressure formed and vacuum formed with light pressure assist carrying same active levels of Ferro Master Batch ™ VCI active (metalguard masterbatch)

| MATERIAL TESTED | JAR ID NO | 7 DAYS | 14 DAYS | 21 DAYS | 28 DAYS |
|---|---|---|---|---|---|
| Car body steel 50 mm × 50 mm | 1 | 0% f | 0% f | 0% f | 0% f |
| 1% Ferro Master Batch ™ and pressure formed | | 0% e | 0% e | 0% e | 5% e |
| Car body steel 50 mm × 50 mm | 2 | 0% f | 0% f | 0% f | 0% f |
| 1% Ferro Master Batch ™ and pressure formed | | 0% e | 0% e | 0% e | 5% e |
| Car body steel 50 mm × 50 mm | 3 | 0% f | 0% f | 0% f | 0% f |
| 1% Ferro Master Batch ™ and vacuum formed and light pressure assist. | | 0% e | 0% e | 0% e | 0% e |
| Car body steel 50 mm × 50 mm | 4 | 0% f | 0% f | 0% f | 0% f |
| 1% Ferro Master Batch ™ and vacuum formed and pressure assist. | | 0% e | 0% e | 0% e | 0% e |
| Car body steel 50 mm × 50 mm | 5 | 0% f | 0% f | 0% f | 10% e |
| clear/control sample | | 2% e | 5% e | 10% e | 30% f |
| Car body steel 50 mm × 50 mm | 6 | 0% f | 0% f | 0% f | 10% e |
| clear/control sample | | 2% e | 5% e | 10% e | **30% F |

Edge test 0-100% estimation of amount of corrosion occurring on edge of car body steel.
Face test 0-100% estimation of amount of corrosion occurring on face of car body steel.
TESTING CONDITIONS: commence 6 hours ambient switching to 6 hours heating setting 40-44° C. Back to 6 hours ambient then 6 hours at −5° C.
TESTING PANELS: 50 MM$^2$ CAR BODY STEEL
PREPARATION: Abrade with 240 Adalox paper Hexane wash. Wrapped with rigid plastic 100 mm × 150 mm. Samples placed on tables in separate jars with 50 ml. Demineralised water.

TABLE 4

ACCELERATED CORROSION TESTING
Test no. 32
Testing of vci ferro styrene in both mono and Co-extruded materials

| | |
|---|---|
| 1 | Mono-3% vci in 486 styrene 700 um |
| 2 | co-ex in 486-555 styrene 80 um/620 um (3% in 80 um) |
| 3 | co-ex in 486-450 styrene 80 um/620 um (3% in 80 um) |
| 4 | pre vacuum forming samples numbered 1-8 - extruded film only |
| 5 | post vacuum forming samples 9-12 - formed into protective covers by vacuum forming with light pressure assist. |

| MATERIAL TESTED | JAR ID NO | 7 DAYS | 14 DAYS | 21 DAYS | 28 DAYS |
|---|---|---|---|---|---|
| Car body steel 50 mm × 50 mm | 1 | 0% EDGE | 0% EDGE | 0% EDGE | 0% EDGE |
| 486 styrene 3% ferro @700 um | | 0% FACE | 0% FACE | 0% FACE | 0% FACE |
| Car body steel 50 mm × 50 mm | 2 | 0% EDGE | 0% EDGE | 0% EDGE | 0% EDGE |
| 486 styrene 3% ferro @700 um | | 0% FACE | 0% FACE | 0% FACE | 0% FACE |
| Car body steel 50 mm xz 50 mm | 3 | 0% EDGE | 0% EDGE | 0% EDGE | 0% EDGE |
| 486/555 styrene 3% @ 80 um | | 0% FACE | 0% FACE | 0% FACE | 0% FACE |
| Car body steel 50 mm × 50 mm | 4 | 0% EDGE | 0% EDGE | 0% EDGE | 0% EDGE |
| 486/555 styrene 3% @ 80 um | | 0% FACE | 0% FACE | 0% FACE | 0% FACE |
| Car body steel 50 mm × 50 mm | 5 | 0% EDGE | 0% EDGE | 0% EDGE | 0% EDGE |
| 486/450 styrene 3% @ 80um | | 0% FACE | 0% FACE | 0% FACE | 0% FACE |
| Car body steel 50 mm × 50 mm | 6 | 0% EDGE | 0% EDGE | 0% EDGE | 0% EDGE |
| 486/450 styrene 3% @ 80 um | | 0% FACE | 0% FACE | 0% FACE | 0% FACE |
| Car body steel 50 mm × 50 mm | 7 | 15% EDGE | 20% EDGE | 35% EDGE | 60% EDGE |
| Natural 486 (control sample) | | 20% FACE | 30% FACE | 60% FACE | 70% FACE |
| Car body steel 50 mm × 50 mm | 8 | 10% EDGE | 20% EDGE | 45% EDGE | 70% EDGE |
| Natural 486 (control sample) | | 20% FACE | 30% FACE | 60% FACE | 80% FACE |
| Car body steel 50 mm × 50 mm | 9 | 0% EDGE | 0% EDGE | 0% EDGE | 0% EDGE |
| (f)486 styrene 3% ferro @700 um | | 0% FACE | 0% FACE | 0% FACE | 0% FACE |
| Car body steel 50 mm × 50 mm | 10 | 0% EDGE | 0% EDGE | 0% EDGE | 0% EDGE |
| (f)486/555 styrene 3% in 80 um | | 0% FACE | 0% FACE | 0% FACE | 0% FACE |
| Car body steel 50 mm × 50 mm | 11 | 0% EDGE | 0% EDGE | 0% EDGE | 0% EDGE |
| (f)486/450 styrene 4% in 80 um | | 0% FACE | 0% FACE | 0% FACE | 0% FACE |

TESTING CONDITIONS: 6 HOURS HEATING SETTING 40° MAX 44° C. 6 HOURS COOLING SETTING NO 6 MIN 1° C.
TESTING PANELS: 50 MM$^2$ CAR BODY STEEL
PREPARATION: Abrade with 240 Adalox paper Hexane wash. Wrapped with paper 100 mm × 150 mm. Samples placed on tables in separate jars with 50 ml demineralised water.

The claims defining the invention are as follows:

1. Corrosion inhibiting packaging for protecting a metal object having a bare metal surface by providing a corrosion inhibiting atmosphere around the bare metal surface,
   the packaging comprising a substrate having
   a base layer for providing rigidity to the substrate to maintain a shape imparted to the substrate, and
   a capping layer containing a corrosion inhibiting compound in an amount allowing controlled release of the corrosion inhibiting compound from the substrate to provide the corrosion inhibiting atmosphere around the bare metal surface,
   the substrate being formed by co-extruding the base layer and the capping layer, the packaging being in a semi-rigid or rigid form when shaped, wherein the shaped packaging is for covering the bare metal surface of the object to protect the bare metal surface, and the packaging being shaped for direct attachment to the object for covering the bare metal surface, the packaging being oriented such that when attached to the object, the capping layer faces the bare metal surface to provide the corrosion inhibiting atmosphere.

2. Corrosion inhibiting packaging according to claim 1 in which the packaging is one of a cover, cap, shroud, housing and insert.

3. Corrosion inhibiting packaging according to claim 1 in which the packaging is shaped for snap fitting engagement of the packaging to the object.

4. Corrosion inhibiting packaging according to claim 2 in which the cover is shaped for attaching to a component of a motor vehicle.

5. Corrosion inhibiting packaging according to claim 4 in which the component of the motor vehicle is a clutch/flywell assembly or a disc brake assembly or a rotor of a brake assembly.

6. Corrosion inhibiting packaging according to claim 1 in which the packaging has a cavity for either partially or fully receiving the object or part of the object to be protected wherein the corrosion inhibiting atmosphere is formed within the cavity.

7. Corrosion inhibiting packaging according to claim 1 in which the substrate further comprises an additional layer wherein the additional layer is co-extruded with the base layer and the capping layer to form the substrate as a triple layered co-extruded substrate.

8. Corrosion inhibiting packaging according to claim 7 in which the additional layer includes a corrosion inhibiting compound to assist in controlled release of the corrosion inhibiting compound from the packaging.

9. Corrosion inhibiting packaging according to claim 7 in which the additional layer is a filler layer located intermediate the base layer and the capping layer.

10. Corrosion inhibiting packaging according to claim 7 in which the additional layer is an adhesive or tie layer located intermediate the base layer and the capping layer.

11. Corrosion inhibiting packaging according to claim 7 in which the additional layer is a barrier layer located intermediate the base layer and capping layer or is located on the other side of base layer to the side having the capping layer, the barrier layer being impervious to moisture.

12. Corrosion inhibiting packaging according to claim 7 in which the substrate is a triple co-extruded layer in which the base layer is a 25 micron thick layer of linear low density polyethylene containing additives, the additional layer is a filler layer comprising a 150 micron thick low density polyethylene layer and the capping layer is a 25 micron thick linear low density polyethylene layer containing 5% of the corrosion inhibiting compound.

13. Corrosion inhibiting packaging according to claim 1 in which the capping layer includes one of styrene, styrene butadiene rubber, ethylene vinyl acetate, polypropylene and combinations thereof.

14. Corrosion inhibiting packaging according to claim 13 in which the capping layer is a styrene butadiene rubber layer having from 0.1 to 10% rubber content.

15. Corrosion inhibiting packaging according to claim 13 in which the capping layer is a styrene butadiene rubber having from 0.5% to 5% rubber content.

16. Corrosion inhibiting packaging according to claim 13 in which the capping layer is a styrene butadiene rubber having about 2% rubber content.

17. Corrosion inhibiting packaging according to claim 13 in which the capping layer is STYRON 450.

18. Corrosion inhibiting packaging according to claim 1 in which the base layer is selected from the group consisting of polyethylene, polypropylene, polystyrene, styrene butadiene rubber, and ethylene vinyl acetate.

19. Corrosion inhibiting packaging according to claim 18 in which the base layer is one of STYRON 484, STYRON 486, and STYRON 450.

20. Corrosion inhibiting packaging according to claim 1 in which the base layer has a thickness of from 25 micron to 1000 micron.

21. Corrosion inhibiting packaging according to claim 1 in which the base layer has a thickness of from 400 to 900 micron.

22. Corrosion inhibiting packaging according to claim 1 in which the base layer has a thickness of from 500 to 900 micron.

23. Corrosion inhibiting packaging according to claim 1 in which the base layer has a thickness of from 600 to 900 micron.

24. Corrosion inhibiting packaging according to claim 1 in which the corrosion inhibiting compound is selected from the group consisting of sodium nitrite, dicyclohexylamine nitrite, cyclohexylamine nitrite, diisopropylamine nitrite, tolyltriazole amine salts, carboxylates, bezoates, triazole sodium nitrate, and cyclohexamine.

25. Corrosion inhibiting packaging according to claim 1 in which the amount of corrosion inhibiting compound added to the substrate is from 0.001% to 20% by weight based on the total weight of the substrate.

26. Corrosion inhibiting packaging according to claim 1 in which the amount of corrosion inhibiting compound added to the substrate is from 0.01% to 10% by weight based on the total weight of the substrate.

27. Corrosion inhibiting packaging according to claim 1 in which the amount of corrosion inhibiting compound added to the substrate is from 0.1% to about 8% by weight based on the total weight of the substrate.

28. Corrosion inhibiting packaging according to claim 1 in which the amount of corrosion inhibiting compound added to the substrate is from 1 to 6% by weight based on the total weight of the substrate.

29. Corrosion inhibiting packaging according to claim 1 in which the amount of corrosion inhibiting compound added to the substrate is from 1 to 5% by weight based on the total weight of the substrate.

30. Corrosion inhibiting packaging according to claim 1 in which the amount of corrosion inhibiting compound added to the capping layer is in an amount of from 0.0001 gram per square meter to 10 grams per square meter.

31. Corrosion inhibiting packaging according to claim 1 in which the amount of corrosion inhibiting compound added to the capping layer is in an amount of from 0.0002 gram per square meter to 2.0 gram per square meter.

32. Corrosion inhibiting packaging according to claim 1 in which the amount of corrosion inhibiting compound added to the capping layer is in an amount of from 0.002 gram per square meter to 1.0 gram per square meter.

33. Corrosion inhibiting packaging according to claim 1 in which the corrosion inhibiting compound is a vapour corrosion inhibitor (VCI).

34. Corrosion inhibiting packaging according to claim 33 further comprising a vapour corrosion inhibitor emitter to assist in release of the vapour corrosion inhibitor.

35. Corrosion inhibiting packaging according to claim 1 in which the packaging is formed at a temperature of up to about 220° C.

36. Corrosion inhibiting packaging according to claim 1 in which the packaging is formed at a pressure of from 1.45 up to 8 bar.

37. Corrosion inhibiting packaging according to claim 1 in which the packaging is formed at a pressure of from 1.5 up to 6 bar.

38. Corrosion inhibiting packaging according to claim 1 in which the packaging is formed at a pressure of from 1.5 up to 2 bar.

39. Corrosion inhibiting packaging according to claim 1 in which the packaging is shaped by one of moulding, vacuum moulding, pressure forming, high pressure forming and combinations thereof.

* * * * *